(12) United States Patent
Bates et al.

US008966068B2

(10) Patent No.: US 8,966,068 B2
(45) Date of Patent: Feb. 24, 2015

(54) SELECTIVE LOGGING OF NETWORK REQUESTS BASED ON SUBSETS OF THE PROGRAM THAT WERE EXECUTED

(71) Applicant: International Business Machines Corporation, Armonk, NY (US)

(72) Inventors: Cary L. Bates, Rochester, MN (US); Lee Nee Helgeson, Rochester, MN (US); Justin K. King, Rochester, MN (US); Michelle A. Schlicht, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 13/741,688

(22) Filed: Jan. 15, 2013

(65) Prior Publication Data

US 2014/0201352 A1 Jul. 17, 2014

(51) Int. Cl.
*G06F 15/16* (2006.01)
*H04L 29/08* (2006.01)

(52) U.S. Cl.
CPC .................. *H04L 29/08099* (2013.01)
USPC .......................................... 709/224; 718/106

(58) Field of Classification Search
CPC ................ H04L 29/08099; G06F 21/125
USPC .......... 709/200–203, 217–227; 718/100, 106, 718/107
See application file for complete search history.

(56) References Cited

U.S. PATENT DOCUMENTS

| 7,143,442 | B2 | 11/2006 | Scarfe et al. |
| 7,890,299 | B2 | 2/2011 | Fok et al. |
| 8,032,489 | B2 | 10/2011 | Villella et al. |
| 8,156,541 | B1 | 4/2012 | Thomas et al. |
| 8,181,194 | B2 | 5/2012 | Houston |
| 8,793,774 | B1* | 7/2014 | Kumar et al. ...................... 726/6 |
| 2003/0084348 | A1* | 5/2003 | Miyao et al. .................. 713/201 |
| 2012/0005542 | A1 | 1/2012 | Petersen et al. |
| 2012/0144453 | A1 | 6/2012 | Bolik et al. |
| 2013/0324145 | A1* | 12/2013 | Tabet et al. ................ 455/452.2 |
| 2014/0004849 | A1* | 1/2014 | SU et al. ...................... 455/423 |

OTHER PUBLICATIONS

Loic Oria, "Approaches to Multicast over Firewalls: an Analysis," Aug. 27, 1999, pp. 1-24.
Keith Fligg et al., "Network Security Visualization," http://www.cs.arizona.edu/~collberg/Teaching/466-566/2012/Resources/presentations/topic13-final/report.pdf, Apr. 22, 2012, pp. 1-12.
John Kochmar et al., "Preparing to Detect Signs of Intrusion," Jun. 1998, pp. i-24.
Kimmo Hatonen, "Data mining for telecommunications network log analysis," Jan. 30, 2009, pp. 1-2.

* cited by examiner

*Primary Examiner* — Moustafa M Meky
(74) *Attorney, Agent, or Firm* — Owen J. Gamon

(57) ABSTRACT

In an embodiment, in response to detecting a request by a program to access a network, if the request is the first time that the program requests to access the network, a subset of instructions is replaced in the program with supervisor call instructions. The supervisor call instructions cause respective interrupts of execution of the program. In response to each of the respective interrupts of execution of the program, the supervisor call instructions that caused the respective interrupts are replaced with the respective swapped instructions, and if a number of the respective interrupts of execution exceed a trap threshold, all remaining of the respective swapped instructions are stored to the program.

20 Claims, 8 Drawing Sheets

TRAP TABLE (156)

| PROGRAM ID (412) | ADDRESS (414) | SWAPPED INSTRUCTION (416) | |
|---|---|---|---|
| PROGRAM A | 1 | IF D > 2 | 402 |
| PROGRAM A | 4 | ELSE | 404 |
| PROGRAM A | 5 | IF D * 3 > Y | 406 |
| PROGRAM A | 8 | ELSE | 408 |

FIG. 4

PROGRAM TABLE (154)

| PROGRAM ID (510) | NUMBER OF NETWORK ACCESSES (512) | COMPLETE LOGGING (514) | NUMBER OF TRAPS ENCOUNTERED (516) | |
|---|---|---|---|---|
| PROGRAM A | 1 | TRUE | 1 | 502 |
| PROGRAM B | 8 | FALSE | 2 | 504 |
| PROGRAM C | 105 | FALSE | 24 | 506 |

SELECTIVE LOGGING OF NETWORK REQUESTS BASED ON SUBSETS OF THE PROGRAM THAT WERE EXECUTED

FIELD

An embodiment of the invention generally relates to computer systems and more particularly to computer systems connected to a network that save information regarding the network requests to a log.

BACKGROUND

Computer systems typically comprise a combination of computer programs and hardware, such as semiconductors, transistors, chips, circuit boards, storage devices, and processors. The computer programs are stored in the storage devices and are executed by the processors.

Computers are often connected via networks, such as in cloud computing or client/server models. In such models, computers typically execute a program known as a firewall, whose purpose is to help keep the computers and the network secure. Firewalls typically control the incoming and outgoing data between a computer and a network by analyzing the data, determining whether or not the computer should allow the data to be sent to or received from the network, and by logging (saving or storing) selected portions (or all) of the data to a log file.

SUMMARY

A method, computer-readable storage medium, and computer system are provided. In an embodiment, in response to detecting a request by a program to access a network, if the request is the first time that the program requests to access the network, a subset of instructions is replaced in the program with supervisor call instructions, and the subset of instructions are saved as respective swapped instructions, wherein the supervisor call instructions cause respective interrupts of execution of the program. If a number of network accesses requested by the program is less than a first network threshold, complete logging of the request is performed. In response to each of the respective interrupts of execution of the program, the supervisor call instructions that caused the respective interrupts are replaced with the respective swapped instructions, and if a number of the respective interrupts of execution exceed a trap threshold, all remaining of the respective swapped instructions are stored to the program.

BRIEF DESCRIPTION OF THE SEVERAL VIEWS OF THE DRAWINGS

FIG. 4 depicts a block diagram of an example data structure for a trap table, according to an embodiment of the invention.

FIG. 5 depicts a block diagram of an example data structure for a program table, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
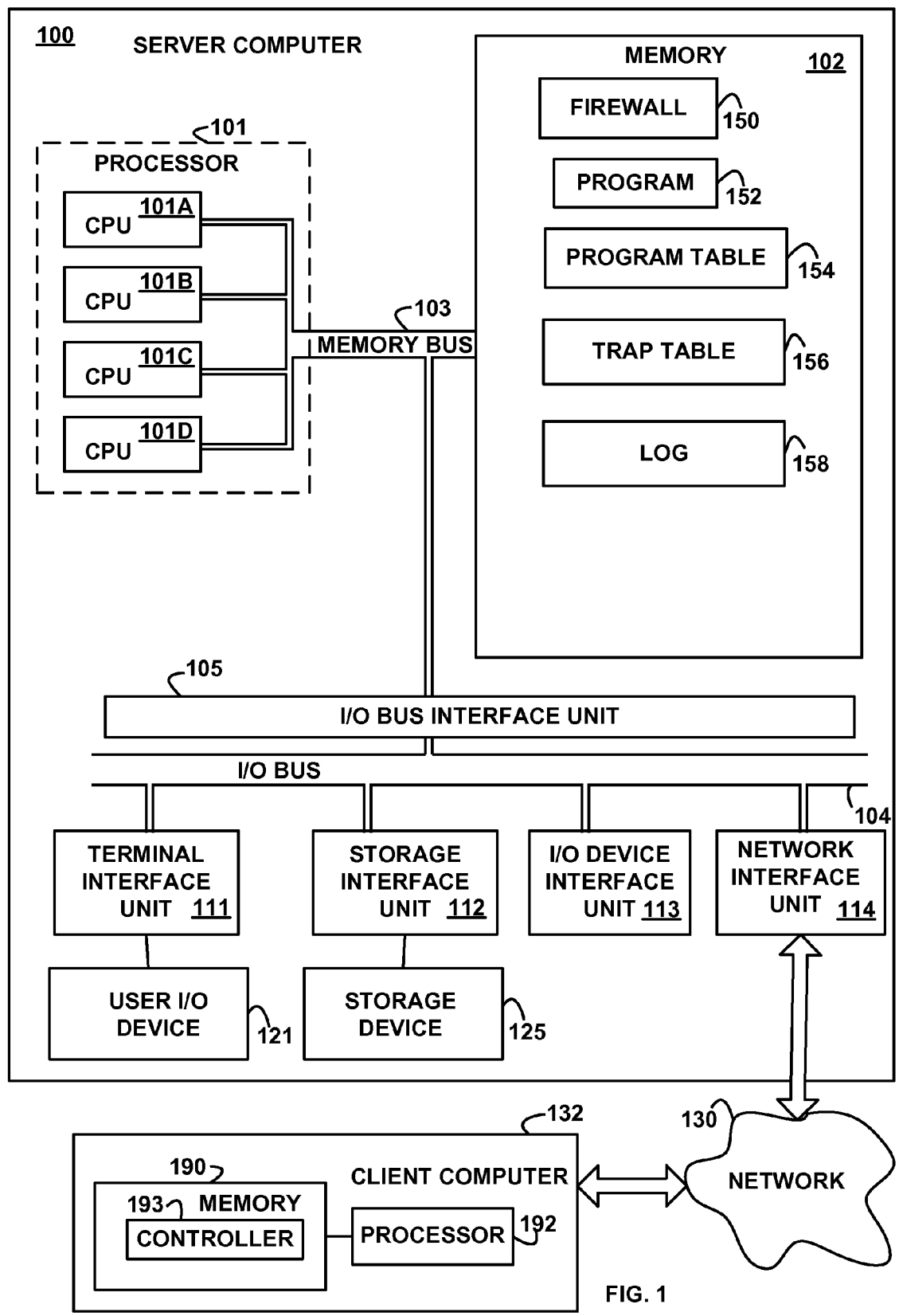
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanism and apparatus of embodiments of the present invention apply equally to any appropriate computing system. Although one server computer system 100 is illustrated in FIG. 1, multiple server computer systems having some or all of the hardware and program components of the server computer system 100 may be connected to the network 130.

The major components of the server computer system 100 comprise one or more processors 101, a memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a firewall 150, a program 152, a program table 154, a trap table 156, and a log 158. Although the firewall 150, the program 152, the program table 154, the trap table 156, and the log 158 are illustrated as being contained within the memory 102 in the server computer system 100, in other embodiments some or all of them may be on different computer systems and may be accessed remotely, e.g., via the network 130. The server computer system 100 may use virtual addressing mechanisms that allow the programs of the server computer system 100 to behave as if they only have access to a large, single storage entity instead of access to multiple, smaller storage entities. Thus, while the firewall 150, the program 152, the program table 154, the trap table 156, and the log 158 are illustrated as being contained within the memory 102, these elements are not necessarily all completely contained in the same storage device at the same time. Further, although the firewall 150, the program 152, the program table 154, the trap table 156, and the log 158 are illustrated as being separate entities, in other embodiments some of them, portions of some of them, or all of them may be packaged together.

In an embodiment, the firewall 150 and the program 152 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In an embodiment, the firewall 150 is implemented in hardware via semiconductor devices, chips, field programmable gate arrays, logical gates, circuits, circuit cards, and/or other physical hardware devices in lieu of, or in addition to, a processor-based system. In an embodiment, the firewall 150 and/or the program 152 comprise data in addition to instructions or statements.

The memory bus 103 provides a data communication path for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and the client computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In particular, the client computer system 132 comprises memory 190 connected to a processor 192. The memory 190 stores a controller 193, which executes on the processor 192. The controller 193 may receive the program 152 from the server computer system 100, store the program 152 in the memory 190 and execute the program 152 on the processor 192. The program table 154, the trap table 156, and the log data 158 may also be stored in the memory 190. In another embodiment, the controller 193 sends data to and/or receives data from the program 152 via the network 130, and the program 152 accesses the network 130, in order to interact with the controller 193 and/or the data sent or received by the controller 193.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and/or the client computer system 132 and that, when read and executed by one or more processors in the server computer system 100 and/or the client computer system 132 or when interpreted by instructions that are executed by one or more processors, cause the server computer system 100 and/or the client computer system 132 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
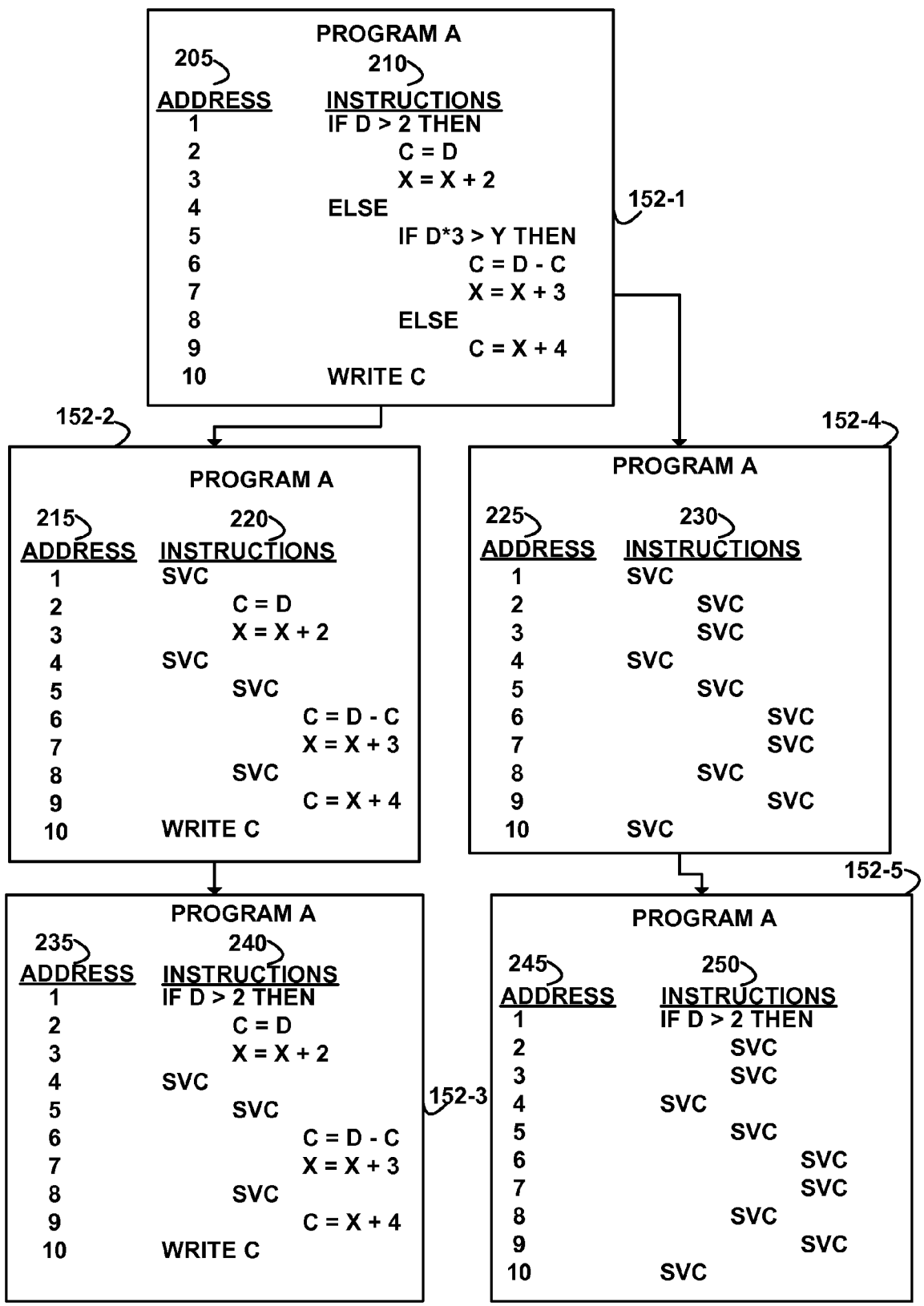
FIG. 2 depicts a block diagram of an example program with instructions replaced by supervisor call instructions, according to an embodiment of the invention.

FIG. 2 depicts a block diagram of an example program with instructions replaced by supervisor call instructions, according to an embodiment of the invention. FIG. 2 illustrates versions of program A 152-1, 152-2, 152-3, 152-4, and 152-5, which are examples of, and are generically referred to by, the program 152 (FIG. 1). The program A 152-1 comprises addresses 205 and instructions 210, each stored within the program A 152-1 at the respective address 205. The program A 152-2 comprises addresses 215 and instructions 220, each stored within the program A 152-2 at the respective address 215. The program A 152-3 comprises addresses 235 and instructions 240, each stored within the program A 152-3 at the respective address 235. The program A 152-4 comprises addresses 225 and instructions 230, each stored within the program A 152-4 at the respective address 225. The program A 152-5 comprises addresses 245 and instructions 250, each stored within the program A 152-5 at the respective address 245.

The respective addresses 205, 215, 235, 225, and 245 identify the lines, offsets, or addresses of the respective instructions 210, 220, 240, 230, and 250 within the respective program A 152-1, the program A 152-2, the program A 152-3, the program A 152-4, and the program A 152-5. Although the instructions 210, 220, 240, 230, and 250 are illustrated in FIG. 2, for convenience of explanation, as source statements that are interpreted or compiled into machine instructions, in other embodiments the instructions 210, 220, 240, 230, and 250 may be machine instructions that execute on the processor 101 or an intermediate form between source statements and machine instructions, such as byte codes.

The firewall 150 at the server computer system 100 creates the program A 152-2 from the program A 152-1 by replacing a selected subset of the instructions of the program A 152-1 with SVCs (supervisor call) instructions. In various embodiments, an SVC (supervisor call instruction) is an instruction that causes an interrupt to request a service from the operating system, an invalid instruction that causes an interrupt, a breakpoint instruction, or any other instruction that causes the execution of the program 152 to halt and the firewall 150 to gain control of the processor 101.

In the example of FIG. 2, the firewall 150 replaces or swaps only the branch instruction or control flow instructions of the program A 152-1 with SVCs, to create the program A 152-2 while allowing the non-branch instructions to remain in the program A 152-2. Thus, in the example of FIG. 2, the firewall 150 replaced the branch instructions at addresses 215 of "1," "4," "5," and "8" with SVCs, but allowed the non-branch instructions at the addresses 215 of "2," "3," "6," "7," "9," and "10" to remain in the program A 152-2. The firewall 150 stores the swapped instructions that were replaced with the SVCs to the trap table 156.

A control flow instruction is an instruction for which execution of the control flow instruction by the processor 101 causes the processor 101 to make a choice between which of multiple paths through the program 152 are followed by execution of the program 152 on the processor 101. In various embodiments, execution of control flow instructions cause continuation of execution at a different instruction other than the next sequential instruction (in address order), such as an unconditional branch or jump or a call instruction (from which flow of control may or may not return); such as executing a set of instructions only if the criteria of a condition is met, such as a conditional branch instruction; and such as executing a set of instructions zero or more times, until some condition is met, such as loop instruction. In an embodiment, execution of control flow instructions causes (conditionally or unconditionally) the alteration of the contents of a program counter or instruction pointer of the processor 101 from a value that points at the next sequential instruction (in increasing address order) within the program 152 to a different value, so that the order of execution of instructions in the program 152 is changed (unconditionally or unconditionally).

In various embodiments, the program counter or instruction pointer holds either the memory address of the instruction being executed, or the address of the next instruction to be executed by the processor 101. In an embodiment, the processor 101 increments the program counter automatically after fetching a program instruction, so that the processor 101 normally retrieves instructions sequentially from the memory 102, with certain instructions, such as branches, jumps and subroutine calls and returns, interrupting the sequence by placing a new value in the program counter. Such jump instructions allow the processor 101 to choose a new address as the start of the next part of the flow of instructions from the memory 102.

The firewall 150 at the server computer system 100 creates the program A 152-3 from the program A 152-2 by replacing the SVC at the address "1" with the original, swapped instruction that existed in the program A 152-1 prior to the instruction being replaced by the SVC, in response to execution of the program 152-2 encountering the SVC instruction at the address 215 of "1." The firewall 150 repeatedly replaces SVCs with their respective swapped instructions, as execution of the program encounters the SVCs.

The firewall 150 at the server computer system 100 creates the program A 152-4 from the program A 152-1 by replacing (swapping) a selected subset of the instructions of the program A 152-1 with SVCs (supervisor call) instructions. In the example of FIG. 2, the selected subset that the firewall 150 replaces is all of the instructions in the program A. Thus, the program A 152-4 contains only SVC instructions, and the firewall 150 stores all of the swapped instructions to the trap table 156. The firewall 150 at the server computer system 100 creates the program A 152-5 from the program A 152-4 by replacing the SVC at the address of "1" with the original, swapped instruction that existed in the program A 152-1 prior to the instruction being replaced by the SVC, in response to execution of the program 152-4 encountering the SVC instruction at the address 225 of "1." The firewall 150 repeatedly replaces SVCs with their respective swapped instructions, as execution of the program 152 encounters the SVCs.

Figure 3:
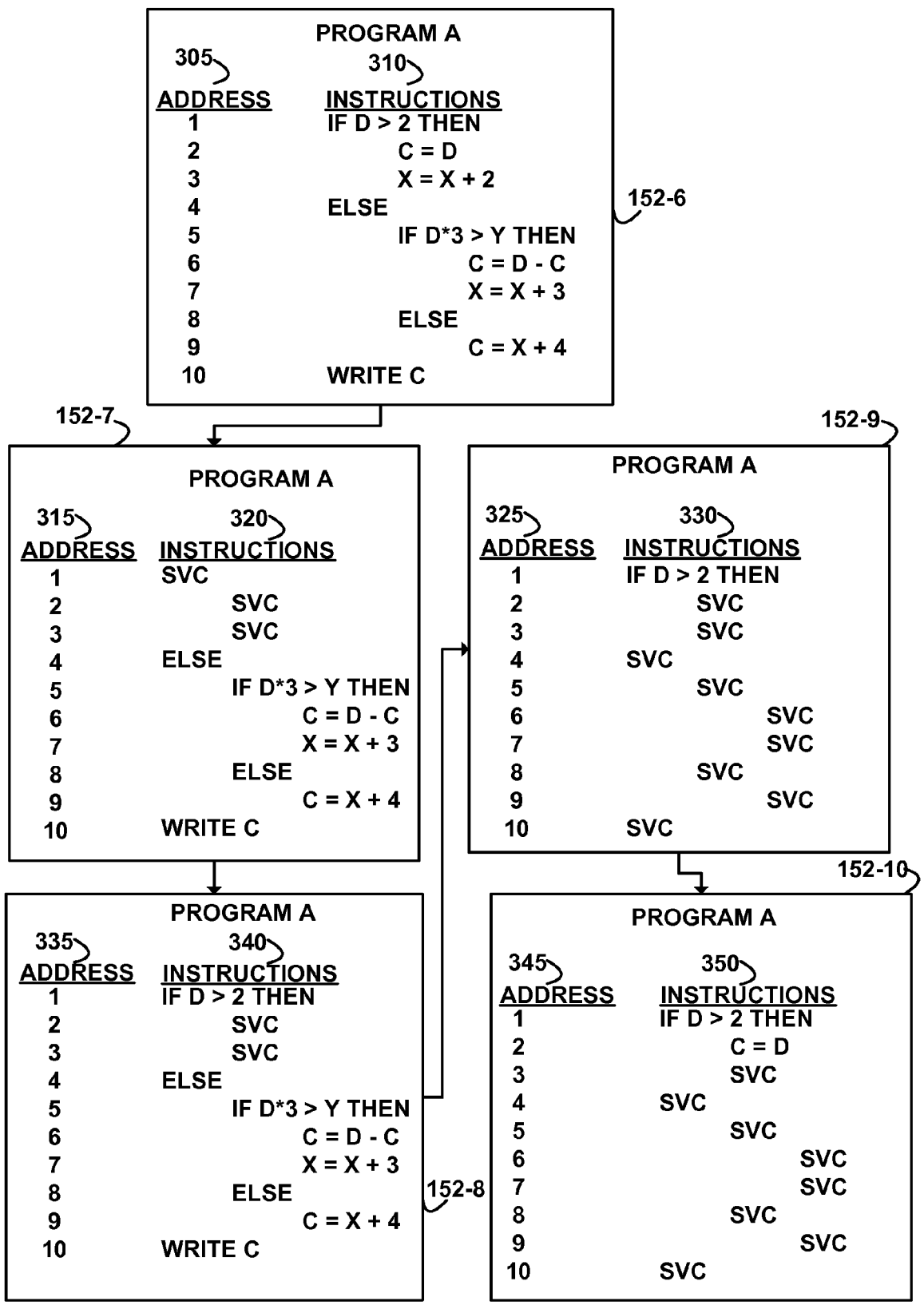
FIG. 3 depicts a block diagram of an example program with instructions in regions replaced by supervisor call instructions, according to an embodiment of the invention.

FIG. 3 depicts a block diagram of an example program with instructions in regions replaced by supervisor call instructions, according to an embodiment of the invention. FIG. 3 illustrates versions of program A 152-6, 152-7, 152-8, 152-9, and 152-10, which are examples of, and are generically referred to by, the program 152 (FIG. 1). The program A 152-6 comprises addresses 305 and instructions 310, each stored within the program A 152-6 at the respective address 305. The program A 152-7 comprises addresses 315 and instructions 320, each stored within the program A 152-7 at the respective address 315. The program A 152-8 comprises addresses 335 and instructions 340, each stored within the program A 152-8 at the respective address 335. The program A 152-9 comprises addresses 325 and instructions 330, each stored within the program A 152-9 at the respective address 325. The program A 152-10 comprises addresses 345 and instructions 350, each stored within the program A 152-10 at the respective address 345.

The firewall 150 divides the program 152 into regions. In an embodiment, the firewall 150 receives the number of regions from an user or administrator via the user I/O device 121, receives then number of regions from the program 152, from another program, or from the controller 193 via the network 130. In an embodiment, the number of regions is equal to a first network threshold. In another embodiment, the number of regions is set by the designer of the firewall 150. In an embodiment, the firewall 150 divides the program 152 into the number of regions with each region having the same number of instructions, and the regions do not overlap. In another embodiment, the firewall 150 divides the program 152 into the number of regions with some or all of the regions having different numbers of instructions. The regions of the program 152 are subsets of the instructions in the program 152, and the instructions in each region are stored at contiguous addresses in the program 152. In the example of FIG. 3, two regions are illustrated: the first region comprises the instructions at addresses of "1," "2," and "3," and the second region comprises the instructions at the addresses of "4," "5," "6," "7," "8," "9," and "10."

Prior to a first execution of the program 152, the firewall 150 swaps the instructions in the first region with SVCs (as illustrated by the program 152-7) and then executes the program 152. In response to the SVCs being encountered by the first execution of the program 152, the firewall 150 replaces the encountered SVCs with the swapped instructions (as illustrated by the program A 152-8). After the first execution of the program 152 completes and prior to a second execution of the program 152, the firewall 150 swaps instructions in the second region of the program 152 with SVCs while allowing the SVCs in the first region that were not encountered by the first execution (illustrated by the addresses "2" and "3") to remain in the program 152 for the second execution (illustrated by the program 152-9). In response to SVCs being encountered by the second execution of the program 152, the firewall 150 replaces the encountered SVCs with the swapped instructions (as illustrated by the program A 152-10). The firewall 150 continues this process until the firewall 150 has swapped instructions in all of the regions and has executed the program a number of times equal to the number of regions.

FIG. 4 depicts a block diagram of an example data structure of a trap table 156, according to an embodiment of the invention. The example trap table 156 comprises example entries 402, 404, 406, and 408, each of which comprises an example program identifier field 412, an address field 414, and a swapped instruction field 416. The program identifier field 412, in each entry, identifies a program 152, in which a SVC identified by the entry is stored. The address field 414, in each entry, identifies a line, address, or offset in the program 152 identified by the program identifier field 412, in the same entry, in which the SVC of the entry is stored. The swapped instruction field 416, in each entry, specifies the instruction that previously existed at the address 414, in the same entry, in the program 152, in the same entry, prior to being replaced in the program 152 at the address 414 by an SVC instruction.

FIG. 5 depicts a block diagram of an example data structure for a program table 154, according to an embodiment of the invention. The example program table 154 comprises example entries 502, 504, and 506, each of which comprises an example program identifier field 510, a number of network accesses field 512, a complete logging flag field 514, and a number of traps encountered field 516. The program identifier field 510, in each entry, identifies a program 152. The number of network accesses field 512, in each entry, identifies the number of times that the program 152 (identified by the program identifier field 510, in the same entry) requested access (the writing or reading of data) to/from the network 130.

The complete logging flag field 514 specifies whether or not (an indication of true or false) the firewall 150 performs complete logging of the network accesses performed by the program 152 identified by the program identifier field 510, in the same entry. If the complete logging flag field 514 indicates true, then the firewall 150 performs complete logging of the network accesses requested by the program identified by the program identifier field 510, in the same entry. If the complete logging flag field 514 indicates false, then the firewall 150 performs incomplete logging of the network accesses requested by the program identified by the program identifier field 510, in the same entry. For complete logging, the firewall 150 stores more information (a larger amount of information) to the log 158 that describes the network access than the firewall 150 stores to the log 158 for incomplete logging. Examples of information that the firewall 150 may store to the log 158 for complete and/or incomplete logging may include the data or any portion thereof that the program 152 sent or received to/from the network 130, the network address of the computer 132 to which or from which the program 152 sent/received the data, an identifier of the program 152, an identifier of a command, request, procedure, method, routine, subroutine, thread, process, instruction, or statement of the program 152 that caused the network access, or any other appropriate data. In an embodiment, when performing complete logging, the firewall 150 flags logged data so that the flagged log data is not removed from the log 158 as quickly, in the event that the data to be written to the log 158 exceeds the maximum size of the log 158, which causes the log 158 to wrap and write over previously saved data. For example, complete logged data survives a threshold number of wraps of the log 158 that is greater than the number of number of log wraps that incomplete or minimally logged data survives in the log 158. The number of traps encountered field 516 specifies the number of times that execution of the program 152 identified by the program identifier field 510, in the same entry, encountered an SVC instruction.

Figure 6:
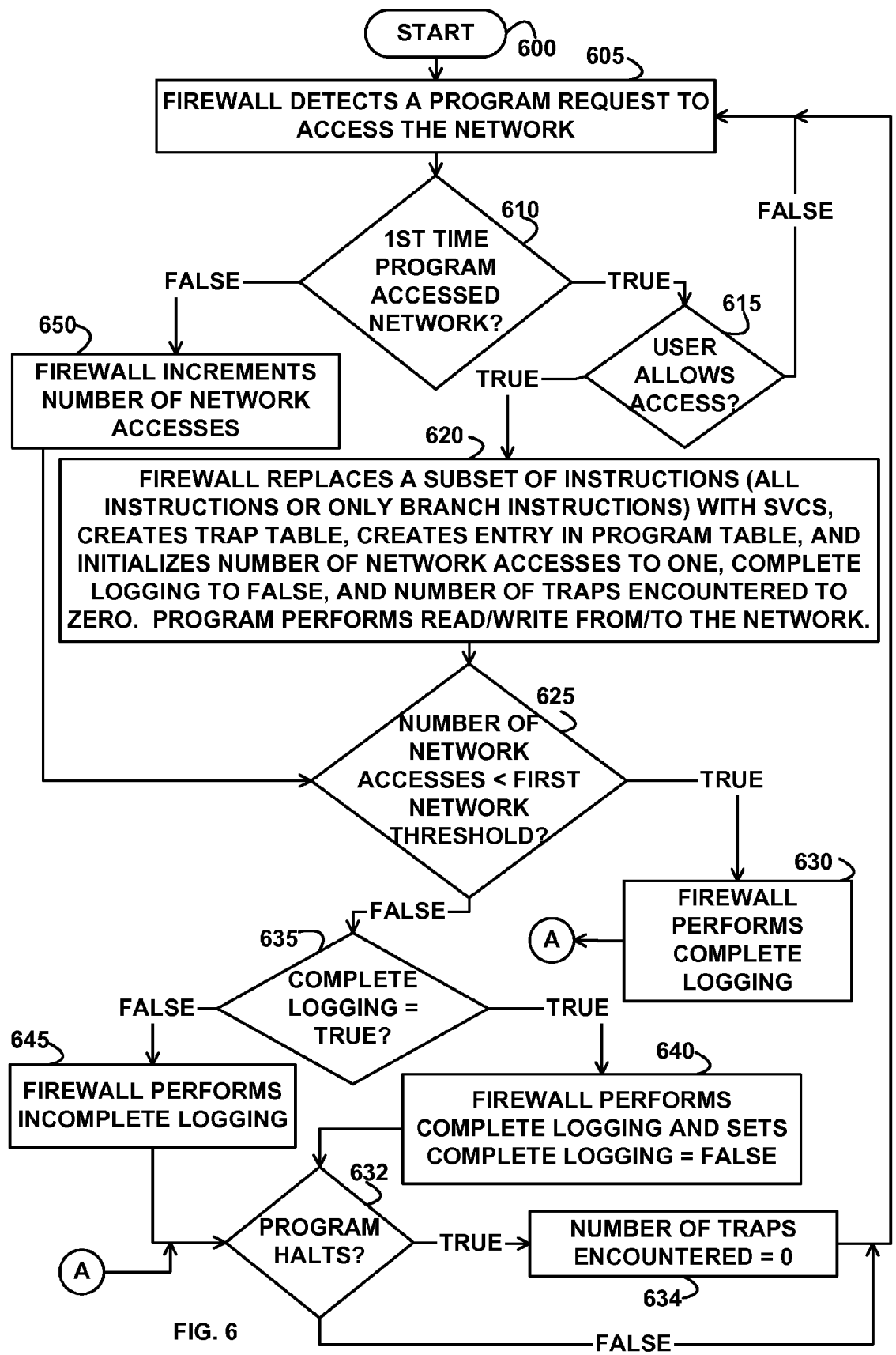
FIG. 6 depicts a flowchart of example processing for responding to a program request to access a network, according to an embodiment of the invention.

FIG. 6 depicts a flowchart of example processing for responding to a program request to access a network, according to an embodiment of the invention. Control begins at block 600. Control then continues to block 605 where the firewall 150 detects a request from a program 152 to access the network 130. Control then continues to block 610 where the firewall 150 determines whether this request is the first time that the program 152 requested to access the network 130, by searching for an identifier of the program 152 in the program identifier field 510 in entries of the program table 154. If the matching program identifier is not found or if a matching identifier is found and the entry of the matching program identifier has zero in the number of network accesses field 512, then this request is the first time that the program 152 requested to access the network 130. If the matching program identifier is found and the entry of the matching program identifier has more than zero in the number of network accesses field 512, then this request is not the first time that the program 152 requested to access the network 130.

If the determination at block 610 is true, then this request is the first time that the program 152 requested to access the network 130, so control continues to block 615 where the firewall 150 determines whether the user or administrator allows the program 152 to access the network 130. In an embodiment, the firewall 150 prompts the user by sending a message to the user I/O device 121, asking whether or not the user allows the program 152 to access the network 130. In an embodiment, the user enters a response to the message via the user I/O device 121, indicating that either the user allows the program 152 to access the network 130 or the user disallows the program 152 to access the network 130.

If the determination at block 615 is true, then the user allows the program 152 to access the network 130, so control continues to block 620 where the firewall 150 replaces a subset of the instructions (all instructions or only branch instructions) in the program 152 with SVC instructions, creates the trap table 156 for the program 152 (including storing the addresses 414 and swapped instructions 416 that were replaced by the SVC instructions), creates an entry in the program table 154 that identifies the program 152 in the program identifier field 510, and initializes number of network accesses 512 to one, the complete logging flag field 514 to false, and the number of traps encountered field 516 to zero, in the newly created entry of the program table 154. The program 152 performs a read/write from/to the network 130.

Control then continues to block 625 where the firewall 150 determines whether the number of network accesses requested by the program 152 is less than a first network threshold. In various embodiments, the firewall 150 receives various thresholds from the user I/O device 121 and stores the various thresholds to the memory 102 or the thresholds are set by a designer of the firewall 150. If the determination at block 625 is true, then the number of network accesses requested by the program 152 is less than the first network threshold, so control continues to block 630 where the firewall 150 performs complete logging of the request to the log 158. Control then continues to block 632 where the firewall 150 determines whether execution of the program 152 has halted. If the determination at block 632 is true, then execution of the program 152 has halted, so control continues to block 634 where the firewall 150 resets the number of traps 516 encountered in the entry of the program table 154 for the program 152 to zero. In this way, the number of traps encountered 516 for the program 152 indicates the number of traps encountered by a single execution of the program 152. Control then returns to block 605 where the firewall 150 receives another request to access the network 130 from the same or a different program 152, as previously described above. If the determination at block 632 is false, then the execution of the program 152 has not halted, so control returns to block 605, as previously described above.

If the determination at block 625 is false, then the number of network accesses requested by the program 152 is greater than or equal to the first network threshold, so control continues to block 635 where the firewall 150 determines whether the complete logging flag field 514 in the entry of the program table 154 for the program 152 indicates true. If the determination at block 635 is true, then the complete logging flag field 514 in the entry of the program table 154 for the program 152 indicates true, so control continues to block 640 where the firewall 150 performs complete logging to the log 158 and sets the complete logging flag field 514 in the entry of the program table 154 for the program 152 to indicate false. Control then continues to block 632, as previously described above. Control then returns to block 605 where the firewall 150 receives another request to access the network 130 from the same or a different program 152, as previously described above.

If the determination at block 635 is false, then the complete logging flag field 514 in the entry of the program table 154 for the program 152 indicates false, so control continues to block 645 where the firewall 150 performs incomplete logging or minimal logging to the log 158, which stores less data to the log 158 than is stored by the complete logging. Control then continues to block 632, as previously described above.

If the determination at block 615 is false, then the user does not allow the program 152 to access the network 130, so control returns to block 605 where the firewall 150 detects another request to access the network 130, from the same or a different program 152, as previously described above.

If the determination at block 610 is false, then this request is not the first time that the program 152 requested to access the network 130, so control continues to block 650 where the firewall 150 increments the number of network accesses field 512 in the entry of the program table 154 with a program identifier field 510, in the same entry, that matches the identifier of the program that requested access to the network 130. Control then continues to block 625, as previously described above.

Figure 7:
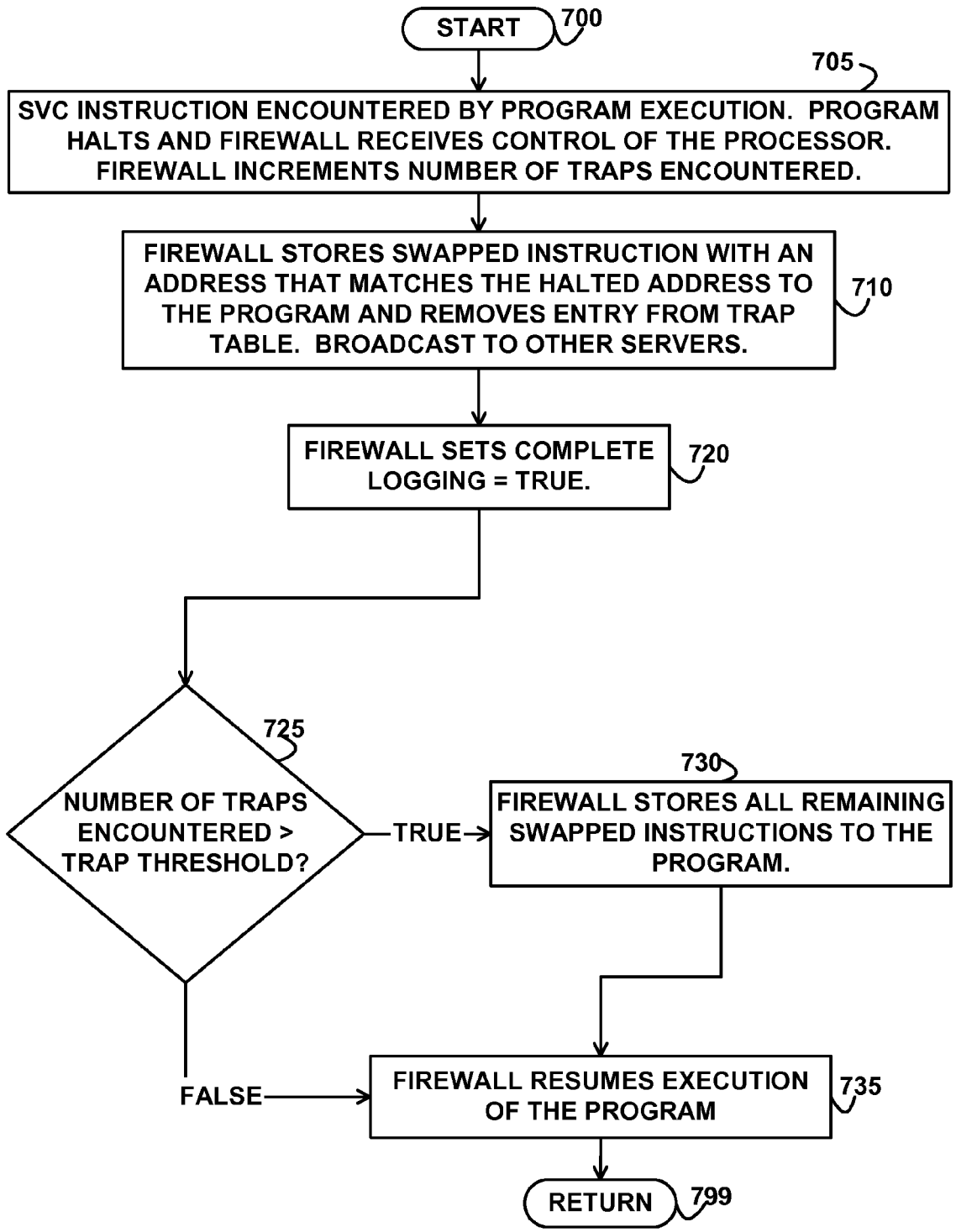
FIG. 7 depicts a flowchart of example processing for responding to a supervisor call instruction being encountered by execution of a program, according to an embodiment of the invention.

FIG. 7 depicts a flowchart of example processing for responding to a supervisor call instruction being encountered by execution of a program, according to an embodiment of the invention. Control begins at block 700. Control then continues to block 705 where execution of the program 152 encounters an SVC instruction, which causes the program 152 to halt execution at the halted address of the SVC instruction, and the firewall 150 receives control of the processor. In response, the firewall 150 increments the number of traps encountered field 516 in the entry of the program table 154 with a program identifier field 510 that matches the identifier of the halted program that encountered the SVC instruction. Control then continues to block 710 where the firewall 150 stores the swapped instruction with an address 414 that matches the halted address from the entry in the trap table 156 to the program 152 and removes the entry from trap table 156. In an embodiment, after the user gives approval, a first firewall 150 at a first computer system sends a copy of the program 152 to all other computer systems connected via the network 130, which execute the same program 152 using the same SVCs at the same addresses within the program 152. Then, every time the first firewall 150 replaces an SVC in the program 152 with a swapped instruction, the firewall 150 broadcasts the removal (sends the program identifier, the swapped instruction, and the address of the instruction at which the SVC was replaced with the swapped instruction) to the other computers that are executing the program 152, which receive the broadcasted information and, in response, replace the SVC in their respective copy of the program 152 with the swapped instruction.

Control then continues to block 720 where the firewall 150 sets the complete logging flag 514 in the entry in the program table 154 with the program identifier field 510 that matches the identifier of the halted program to indicate true. Control then continues to block 725 where the firewall 150 determines whether the number of traps encountered 516 by the halted program is greater than a trap threshold. The firewall 150 makes the determination of block 725 by comparing the number of traps encountered field 516 in the entry of the program table 154 with a program identifier 510 that matches the identifier of the halted program to the trap threshold.

If the determination at block 725 is true, then the number of traps encountered by the halted program is greater than the trap threshold, so control continues to block 730 where the firewall 150 stores all remaining swapped instructions 416 from the trap table 156 to the program 152 at the respective addresses 414 and removes the entries from the trap table 156. Control then continues to block 735 where the firewall 150 resumes execution of the program 152, starting at the halted instruction, which now contains the swapped instruction. Control then continues to block 799 where the logic of FIG. 7 returns.

If the determination at block 725 is false, then the number of traps encountered by the halted program is less than or equal to the trap threshold, so control continues to block 735 where the firewall 150 resumes execution of the program 152, starting at the halted instruction, which now contains the swapped instruction, without storing all remaining swapped instructions to the program 152. Control then continues to block 799 where the logic of FIG. 7 returns.

In another embodiment, the firewall 150 counts the number of times that an SVC instruction at the halted address is encountered by execution of the program 152 and only removes the SVC after a minimum threshold number of encounters have occurred. The firewall 150 further sets the complete logging flag field 514 to indicate true after a minimum threshold number of encounters of the SVC at that address have occurred.

Figure 8:
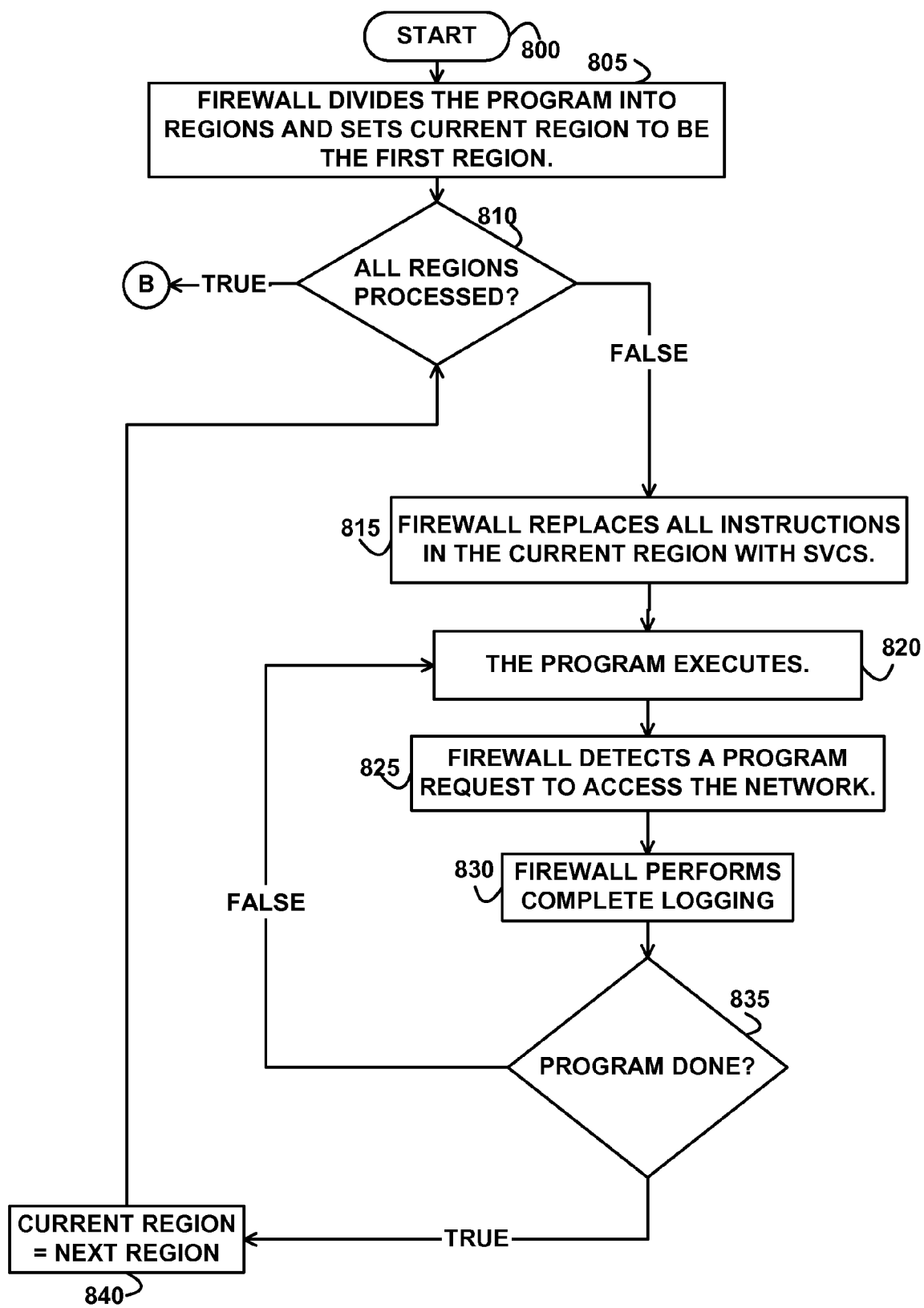
FIG. 8 depicts a flowchart of example processing for regions of a program, according to an embodiment of the invention.
Figure 9:
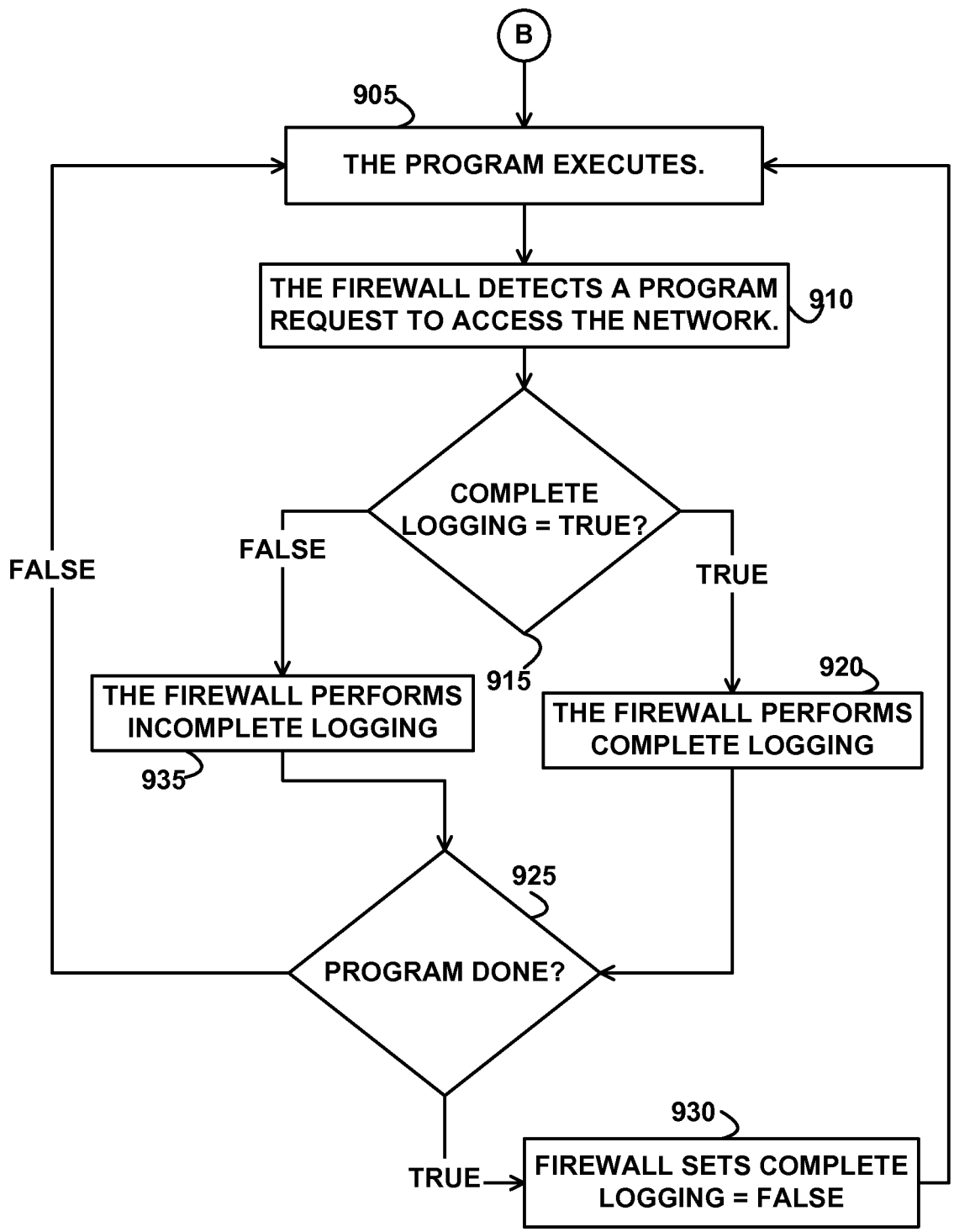
FIG. 9 depicts a flowchart of further example processing for regions of a program, according to an embodiment of the invention.

FIGS. 8 and 9 depict flowcharts of example processing for regions of a program, according to an embodiment of the invention. Control begins at block 800. Control then continues to block 805 where the firewall 150 divides the program 152 into regions and sets a current region to be the first region in the program 152. Control then continues to block 810 where the firewall 150 determines whether all regions of the program 152 have been processed by the loop that starts at block 810. If the determination at block 810 is false, then not all regions of the program 152 have been processed by the loop that starts at block 810, so control continues to block 815 where the firewall 150 replaces all instructions in the current region with SVC instructions, creates entries for the instruction in the trap table 156, and stores the instructions that were replaced to the swapped instruction field 416 in the entries in the trap table 156. The firewall 150 further stores the addresses of the replaced instruction to the address field 414 in the entries in the trap table 156. Any SVC instructions already in the program 152 (which the firewall 150 previously set in a previous execution of the loop and the firewall 150 has not replaced with swapped instructions in response to the SVC instruction being encountered by execution of the program 152) remain in the program 152.

Control then continues to block 820 where the program 152 starts executing on the processor 101. Control then continues to block 825 where the firewall 150 detects a request from the executing program 152 to access the network 130. Control then continues to block 830 where, in response to the request, the firewall 150 performs complete logging. Control then continues to block 835 where if the program 152 is not done executing, control returns to block 820 where the program 152 continues executing. Control then continues to block 825 as previously described above.

If the program 152 is done executing at block 835, then control continues to block 840 where the firewall 150 sets the current region to be the next region in the program 152. Control then returns to the start of the loop at block 810 where the firewall 150 again determines whether all regions of the program 152 have been processed by the loop that starts at block 810.

If the determination at block 810 is true, then all regions of the program 152 have been processed by the loop that starts at block 810, so control continues to block 905 of FIG. 9 where the program begins executing on the processor 101. Control then continues to block 910 where the firewall 150 detects a request from the program 152 to access the network 130. Control then continues to block 915 where, in response to the request to access the network 130, the firewall 150 determines whether the complete logging flag field 514 in the entry of the program 152 in the program table 154 for the program 152 indicates true. If the determination at block 915 is true, then the complete logging flag field 514 in the entry of the program 152 in the program table 154 indicates true, so control continues to block 920 where the firewall 150 performs complete logging of the request to access the network 130. Control then continues to block 925 where, if the program 152 is done executing, control continues to block 930 where the firewall 150 sets the complete logging flag field 514 for the program 152 to indicate false. Control then returns to block 905 where the program 152 restarts executing at the beginning of the program 152.

If the program 152 is not done executing at block 925, then control continues from block 925 to block 905 where the program 152 continues executing, without setting the complete logging flag field 514 for the program 152 to false.

If the determination at block 915 is false, then the complete logging flag field 514 for the program 152 is false, so control continues to block 935 where the firewall 150 performs incomplete or minimal logging of the request. Control then continues to block 925, as previously described above.

In this way, an embodiment of the invention saves more data to the log 158 for network accesses initiated by subsets of the program 152 that have not been previously executed (and thus pose more of a security risk) and saves less data to the log 158 for network accesses initiated by subsets of the program 152 that have been previously executed (and thus pose less of a security risk). Thus, an embodiment of the invention saves memory and increases performance.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   in response to detecting a request by a program to access a network, if the request is a first time that the program requests to access the network, replacing a subset of instructions in the program with supervisor call instructions and saving the subset of instructions as respective swapped instructions, wherein the supervisor call instructions cause respective interrupts of execution of the program;
   if a number of network accesses requested by the program is less than a first network threshold, performing complete logging of the request; and
   in response to each of the respective interrupts of execution of the program, replacing the supervisor call instructions that caused the respective interrupts with the respective swapped instructions and if a number of the respective interrupts of execution exceed a trap threshold, storing all remaining of the respective swapped instructions to the program.

2. The method of claim 1, further comprising:
   if the number of network accesses requested by the program is greater than the first network threshold, performing incomplete logging of the request, wherein the performing incomplete logging stores less data to a log than the performing the complete logging.

3. The method of claim 1, wherein the subset of instructions in the program comprises all branch instructions in the program.

4. The method of claim 1, wherein the subset of instructions in the program comprises all instructions in the program.

5. The method of claim 1, further comprising:
   in response to the replacing the supervisor call instructions that caused the respective interrupts with the respective swapped instructions, sending the respective swapped instructions from a first computer to a second computer, wherein the second computer receives the respective swapped instructions and replaces supervisor call instructions in a copy of the program at the second computer with the swapped instructions.

6. The method of claim 1, further comprising:
   if the number of the respective interrupts of execution does not exceed a trap threshold, refraining from storing all remaining of the respective swapped instructions to the program.

7. The method of claim 1, further comprising:
   dividing the program into a plurality of regions, wherein the subset of the instructions comprises one of the plurality of regions.

8. The method of claim 7, further comprising:
   repeatedly replacing instructions in the plurality of regions with supervisor call instructions and re-executing the program.

9. A computer-readable storage medium encoded with instructions, wherein the instructions when executed comprise:
   in response to detecting a request by a program to access a network, if the request is a first time that the program requests to access the network, replacing a subset of instructions in the program with supervisor call instructions and saving the subset of instructions as respective swapped instructions, wherein the supervisor call instructions cause respective interrupts of execution of the program;
   if a number of network accesses requested by the program is less than a first network threshold, performing complete logging of the request;
   in response to each of the respective interrupts of execution of the program, replacing the supervisor call instructions that caused the respective interrupts with the respective swapped instructions and if a number of the respective interrupts of execution exceed a trap threshold, storing all remaining of the respective swapped instructions to the program; and
   if the number of network accesses requested by the program is greater than the first network threshold, performing incomplete logging of the request, wherein the performing incomplete logging stores less data to a log than the performing the complete logging.

10. The computer-readable storage medium of claim 9, wherein the subset of instructions in the program comprises all branch instructions in the program.

11. The computer-readable storage medium of claim 9, wherein the subset of instructions in the program comprises all instructions in the program.

12. The computer-readable storage medium of claim 9, further comprising:
   in response to the replacing the supervisor call instructions that caused the respective interrupts with the respective swapped instructions, sending the respective swapped instructions from a first computer to a second computer, wherein the second computer receives the respective swapped instructions and replaces supervisor call instructions in a copy of the program at the second computer with the swapped instructions.

13. The computer-readable storage medium of claim 9, further comprising:
if the number of the respective interrupts of execution does not exceed a trap threshold, refraining from storing all remaining of the respective swapped instructions to the program.

14. The computer-readable storage medium of claim 9, further comprising:
dividing the program into a plurality of regions, wherein the subset of the instructions comprises one of the plurality of regions.

15. The computer-readable storage medium of claim 14, further comprising:
repeatedly replacing instructions in the plurality of regions with supervisor call instructions and re-executing the program.

16. A computer comprising:
a processor; and
memory communicatively connected to the processor, wherein the memory is encoded with instructions, and wherein the instructions when executed by the processor comprise
in response to detecting a request by a program to access a network, if the request is a first time that the program requests to access the network, replacing a subset of instructions in the program with supervisor call instructions and saving the subset of instructions as respective swapped instructions, wherein the supervisor call instructions cause respective interrupts of execution of the program,
if a number of network accesses requested by the program is less than a first network threshold, performing complete logging of the request,
in response to each of the respective interrupts of execution of the program, replacing the supervisor call instructions that caused the respective interrupts with the respective swapped instructions and if a number of the respective interrupts of execution exceed a trap threshold, storing all remaining of the respective swapped instructions to the program, if the number of the respective interrupts of execution does not exceed a trap threshold, refraining from storing all remaining of the respective swapped instructions to the program, and
if the number of network accesses requested by the program is greater than the first network threshold, performing incomplete logging of the request, wherein the performing incomplete logging stores less data to a log than the performing the complete logging.

17. The computer of claim 16, wherein the subset of instructions in the program comprises all branch instructions in the program.

18. The computer of claim 16, wherein the subset of instructions in the program comprises all instructions in the program.

19. The computer of claim 16, wherein the instructions further comprise:
in response to the replacing the supervisor call instructions that caused the respective interrupts with the respective swapped instructions, sending the respective swapped instructions from the computer to a second computer, wherein the second computer receives the respective swapped instructions and replaces supervisor call instructions in a copy of the program at the second computer with the swapped instructions.

20. The computer of claim 16, wherein the instructions further comprise:
dividing the program into a plurality of regions, wherein the subset of the instructions comprises one of the plurality of regions; and
repeatedly replacing instructions in the plurality of regions with supervisor call instructions and re-executing the program.

* * * * *